(12) United States Patent
Ryu et al.

(10) Patent No.: US 11,785,654 B2
(45) Date of Patent: Oct. 10, 2023

(54) SRS BASED DISCOVERY FOR DEVICE TO DEVICE COMMUNICATION

(71) Applicant: QUALCOMM Incorporated, San Diego, CA (US)

(72) Inventors: Jung Ho Ryu, Fort Lee, NJ (US); Tianyang Bai, Bridgewater, NJ (US); Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 16/829,729

(22) Filed: Mar. 25, 2020

(65) Prior Publication Data

US 2020/0351128 A1   Nov. 5, 2020

Related U.S. Application Data

(60) Provisional application No. 62/841,642, filed on May 1, 2019.

(51) Int. Cl.
*H04W 76/14*     (2018.01)
*H04L 25/02*     (2006.01)
(Continued)

(52) U.S. Cl.
CPC .......... *H04W 76/14* (2018.02); *H04B 7/0695* (2013.01); *H04B 7/088* (2013.01);
(Continued)

(58) Field of Classification Search
CPC .................................................... H04W 76/14
See application file for complete search history.

(56) References Cited

U.S. PATENT DOCUMENTS

| 2011/0223953 A1* | 9/2011 | Lee | H04W 76/14 |
| | | | 455/509 |
| 2014/0018010 A1* | 1/2014 | Gao | H04W 8/005 |
| | | | 455/67.13 |

(Continued)

FOREIGN PATENT DOCUMENTS

KR   20190016944 A   2/2019

OTHER PUBLICATIONS

International Search Report and Written Opinion—PCT/US2020/028916—ISA/EPO—dated Mar. 25, 2021 (192355WO).

*Primary Examiner* — Jason E Mattis

(74) *Attorney, Agent, or Firm* — Holland & Hart LLP/Qualcomm Incorporated

(57) ABSTRACT

Systems and methods establishing and maintain a direct User Equipment to User Equipment communication link are disclosed. A User Equipment (UE) may receive a Sounding Reference Signal (SRS) from a neighboring UE. The UE may determine from the SRS that the UE is a good candidate for a direct link. The UE may also determine from the SRS an ID associated with the neighboring UE. The UE may send a direct link request to the UE serving gNB. The serving gNB may forward the request to a gNB serving the neighboring UE. The gNBs may negotiate a joint schedule for a beam a UE to UE beam search. The beam search may be conducted using SRS resources. The results of the beam search may be sent to the gNB and the gNB may determine a beam pair for a direct link.

15 Claims, 11 Drawing Sheets

(51) Int. Cl.
  *H04L 5/00* (2006.01)
  *H04W 16/28* (2009.01)
  *H04L 1/00* (2006.01)
  *H04W 24/10* (2009.01)
  *H04B 7/06* (2006.01)
  *H04B 7/08* (2006.01)

(52) U.S. Cl.
  CPC .......... *H04L 1/0026* (2013.01); *H04L 5/0051* (2013.01); *H04L 25/0226* (2013.01); *H04W 16/28* (2013.01); *H04W 24/10* (2013.01)

(56) References Cited

U.S. PATENT DOCUMENTS

| | | | |
|---|---|---|---|
| 2014/0169310 A1* | 6/2014 | Ma | H04W 56/001 370/329 |
| 2014/0241262 A1 | 8/2014 | Novak et al. | |
| 2017/0163470 A1* | 6/2017 | Seo | H04W 40/246 |
| 2018/0027538 A1* | 1/2018 | Uchiyama | H04W 72/0406 370/329 |
| 2020/0314828 A1* | 10/2020 | Schubert | H04B 7/0695 |
| 2021/0258063 A1* | 8/2021 | Ottersten | H04W 24/04 |

* cited by examiner

US 11,785,654 B2

SRS BASED DISCOVERY FOR DEVICE TO DEVICE COMMUNICATION

CLAIM OF PRIORITY UNDER 35 U.S.C. § 119

This application claims the benefit of U.S. Provisional Application Ser. No. 62/841,642 entitled "SRS Based Discovery for Device to Device Communication" filed on May 1, 2019 which is expressly incorporated by reference herein in its entirety.

BACKGROUND

The following relates generally to wireless communication, and more specifically to discovery of User Equipment (UE) using a Sounding Reference Signal (SRS).

Wireless communications systems are widely deployed to provide various types of communication content such as voice, video, packet data, messaging, broadcast, and so on. These systems may support communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., Long Term Evolution (LTE) system, or a New Radio (NR) system). A wireless multiple-access communications system may include base stations (e.g., a gNB or eNB) or other access network nodes, each simultaneously supporting communication for multiple communication devices, which may be otherwise known as user equipment (UE).

In some wireless systems, base stations and UEs may communicate using directional millimeter wave transmissions (e.g., beams), where beamforming techniques may be applied using one or more antenna arrays or panels to generate beams in different directions. Directional millimeter wave transmissions are expected to be utilized by many 5G compliant devices such as UEs. In many instances, it may be desirable for UEs to establish a direct device to device communication link. UEs must discover good link candidates and identify good directional beams for device to device communication link. Moreover, UEs may need resources for performing a directional beam search.

Accordingly, there is a need for systems and methods for UEs to discover other UEs that may be suitable for direct UE to UE communication links. Establishing a direct link may require a beam search to determine beam pairs for the direct UE to UE communication link. The beam search may require resources for performing the beam search. The following disclosure addresses these needs as well as other needs.

SUMMARY

In one exemplary aspect, a User Equipment (UE) receives a Sounding Reference Signal (SRS) from a neighboring UE. The UE may determine from the SRS that the UE is a good candidate for a direct link. The UE may also determine from the SRS an ID associated with the neighboring UE. The UE may send a direct link request with the ID to the UE serving gNB. The serving gNB may forward the request to a gNB serving the neighboring UE. The gNBs may then negotiate a joint schedule for a UE to UE beam search. The beam search may be accomplished using SRS resources. The results of the beam search may be sent to the gNB. The gNB may determine a beam pair for a direct link. The beam pair information may be sent to the UEs allowing the UE and the neighboring UE to establish a direct link.

In another exemplary aspect, a first User Equipment (UE) may receive a Sounding Reference Signal (SRS) from a second UE and measure a signal quality of the SRS; the first UE may determine whether the second UE is a candidate for a direct link based on the signal quality measurement and transmit a request to a first gNB to establish a direct link with the second UE.

In another exemplary aspect, a second User Equipment (UE) may receive from a second gNB a request to establish a direct link with a first UE and may receive a joint schedule for a beam search from the second gNB. The second UE may perform a beam search procedure according to the joint schedule.

In another exemplary aspect, a first gNB may receive a request for a direct link from a first User Equipment (UE) and may transmit the request for a direct link to a second gNB. The second gNB may negotiate a joint schedule with the second gNB for a beam search.

In another exemplary aspect a second gNB may receive a request for a direct link from a first User Equipment (UE); and negotiate a joint schedule for a beam search with a first gNB.

DETAILED DESCRIPTION

Figure 1:
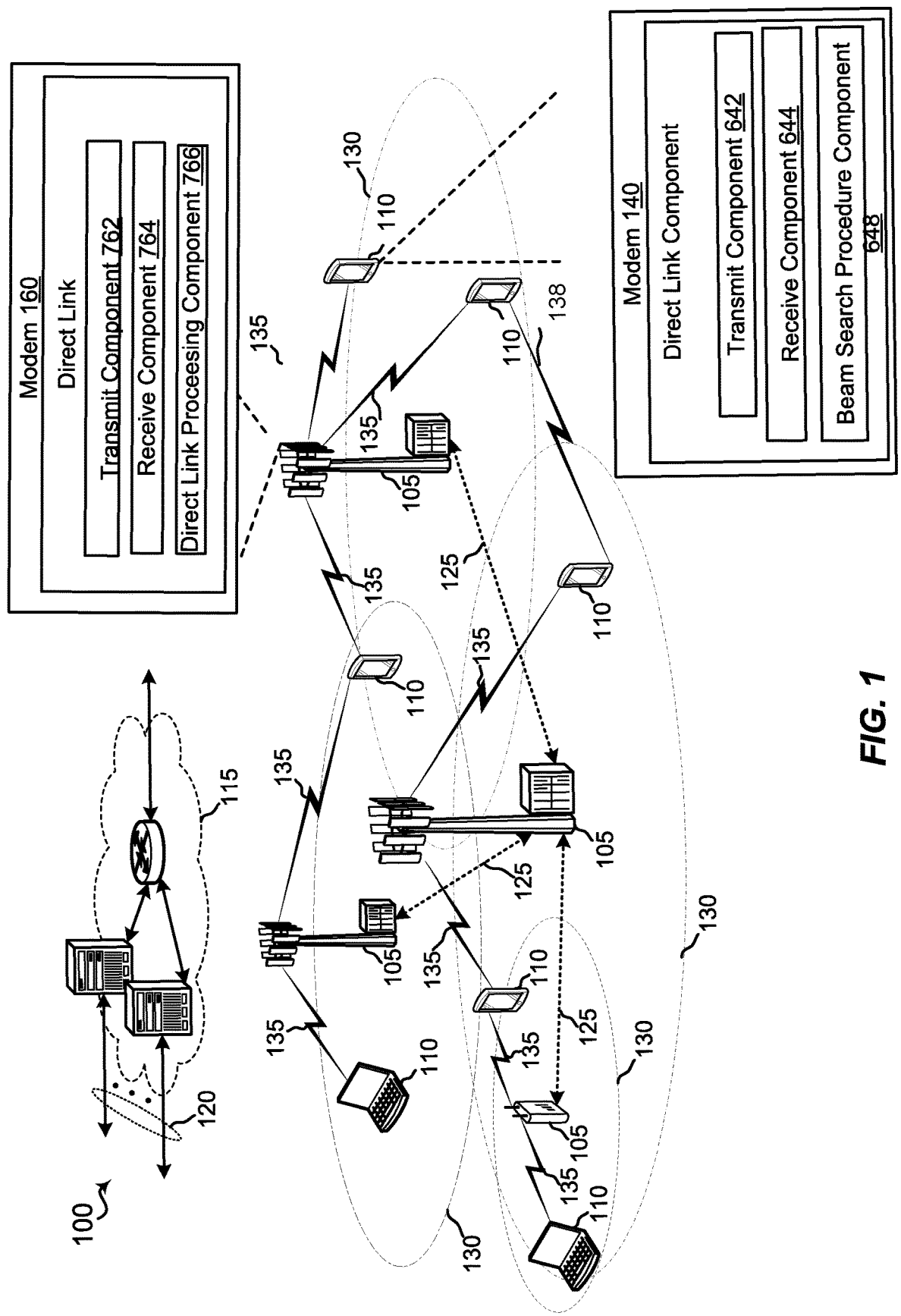
FIG. 1 illustrates an example of a system for wireless communication that supports SRS discovery and direct UE to UE communication in accordance with aspects of the present disclosure.

FIG. 1 illustrates an example of a wireless communications system 100 in accordance with various aspects of the present disclosure. The wireless communications system 100 includes base stations 105, UEs 110, and a core network 115. In some examples, the wireless communications system 100 may be a Long-Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use of a difference in transmit and receive array gains for the calculation of an uplink transmit power.

Base stations 105 may wirelessly communicate with UEs 110 via one or more base station antennas. Each base station 105 may provide communication coverage for a respective geographic coverage area 130. Communication links 135 shown in wireless communications system 100 may include uplink transmissions from a UE 110 to a base station 105, or downlink transmissions, from a base station 105 to a UE 110. Other communication links such as device to device communication link 138 may be a direct UE 110 to UE 110 link. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 110 may be dispersed throughout the wireless communications system 100, and each UE 110 may be stationary or mobile. A UE 110 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 110 may also be able to communicate directly with other UEs (e.g., using a peer-to-peer (P2P) or device-to-device (D2D) protocol). One or more of a group of UEs 110 utilizing D2D communications may be within the coverage area 130 of a cell. Other UEs 110 in such a group may be outside the coverage area 130 of a cell, or otherwise unable to receive transmissions from a base station 105. In some cases, groups of UEs 110 communicating via D2D communications may utilize a one-to-many (1:M) system in which each UE 110 transmits to every other UE 110 in the group. In some cases, a base station 105 facilitates the scheduling of resources for D2D communications. In other cases, D2D communications are carried out independent of a base station 105. UE 110 may transmit SRS and receive SRS allowing for UE 110 to discover neighboring UEs.

Some UEs 110, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 110 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 115 and with one another. For example, base stations 105 may interface with the core network 115 through backhaul links (e.g., 51, etc.). Base stations 105 may communicate with one another over backhaul links 134 (e.g., X2, etc.) either directly or indirectly (e.g., through core network 115). Backhaul links may be wired or unwired. Base stations 105 may perform radio configuration and scheduling for communication with UEs 110 or may operate under the control of a base station controller (not shown). In some examples, base stations 105 may be macro cells, small cells, hot spots, or the like. Base stations 105 may also be referred to as gNBs.

A base station 105 may be connected by an Si interface to the core network 115. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 110 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 120 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 110 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 110 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 110 (e.g., for directional beamforming). However, EHF transmissions may be subject to even greater atmospheric attenuation and shorter range than UHF transmissions.

Wireless communications system 100 may support mmW communications between UEs 110 and base stations 105 and in backhaul links. Devices operating in mmW or EHF bands may have multiple antennas to allow beamforming. That is, a base station 105 may use multiple antennas or antenna arrays to conduct beamforming operations for directional communications with a UE 110. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 110). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 110), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 110. Signals may be transmitted multiple times in different directions (e.g., each transmission may be beamformed differently). A mmW receiver (e.g., a UE 110) may try multiple beams (e.g., antenna subarrays) while receiving the synchronization signals.

In some cases, the antennas of a base station 105 or UE 110 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 110.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 110 and a network device or core network 120 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 110 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 110 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 110 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 110 attempting to access a wireless network may perform an initial cell search by detecting a primary synchronization signal (PSS) from a base station 105. The PSS may enable synchronization of slot timing and may indicate a physical layer identity value. The UE 110 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 110 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration.

After decoding the MIB, the UE 110 may receive one or more system information blocks (SIBs). For example, SIB1 may contain cell access parameters and scheduling information for other SIBs. For instance, SIB1 access information, including cell identity information, and it may indicate whether a UE 110 is allowed to camp on a coverage area 130. SIB1 also includes cell selection information (or cell selection parameters) and scheduling information for other SIBs, such as SIB2. Decoding SDB1 may enable the UE 110 to receive SIB2, where SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1, and includes access information and parameters related to common and shared channels.

After the UE 110 decodes SIB2, it may transmit a RACH preamble to a base station 105. For example, the RACH preamble may be randomly selected from a set of 64 predetermined sequences. This may enable the base station 105 to distinguish between multiple UEs 110 trying to access the system simultaneously. The base station 105 may respond with a random access response that provides an uplink resource grant, a timing advance, and a temporary cell radio network temporary identifier (C-RNTI). The UE 110 may then transmit an RRC connection request along with a temporary mobile subscriber identity (TMSI) (e.g., if the UE 110 has previously been connected to the same wireless network) or a random identifier. The RRC connection request may also indicate the reason the UE 110 is connecting to the network (e.g., emergency, signaling, data exchange, etc.). The base station 105 may respond to the connection request with a contention resolution message addressed to the UE 110, which may provide a new C-RNTI. If the UE 110 receives a contention resolution message with the correct identification, it may proceed with RRC setup. If the UE 110 does not receive a contention resolution message (e.g., if there is a conflict with another UE 110), the UE 110 may repeat the RACH process by transmitting a new RACH preamble.

Wireless devices in wireless communications system 100 may send transmissions in accordance with a certain link budget. The link budget may account for allowed signal attenuation between a UE 110 and a base station 105, as well as antenna gains at the UE 110 and base station 105. Accordingly, the link budget may provide, for example, a maximum transmit power for the various wireless devices within wireless communications system 100. In some cases, a UE 110 may coordinate transmit power with a serving base station 105 to mitigate interference, improve the uplink data rate, and prolong battery life.

Some of the communication devices in wireless communication system 100 may have modems that include a direct link component. For example, a base station 105 may have a base station modem 160 having a direct link component. The direct link component may have a transmit component 762 for transmitting directional beams. The direct link component may also have a receive component 764 for receiving directional beams. The receive component 764 may direct link requests allowing the base station to forward the link request to another base station. The direct link component may have a direct link processing component 766 that may support processing direct link request messages, negotiating a joint schedule, and determining beam pairs. During a beam search procedure, the transmit component may transmit on SRS resources.

A UE 110 may have a UE modem 140 featuring a direct link component. The direct link component may have a transmit component 642 for transmitting directional beams. The direct link component may also have a receive component 644 for receiving one or more directional beams. The direct link component may also have a beam search procedure component 646 for executing beam search procedures. The beam search procedure component 646 may be adapted to executing a beam search procedure in cooperation with another UE using SRS resources. The direct link processing component may be adapted to discover neighboring UEs via an SRS and to determine if a direct link should be established with a neighboring UE.

Figure 2:
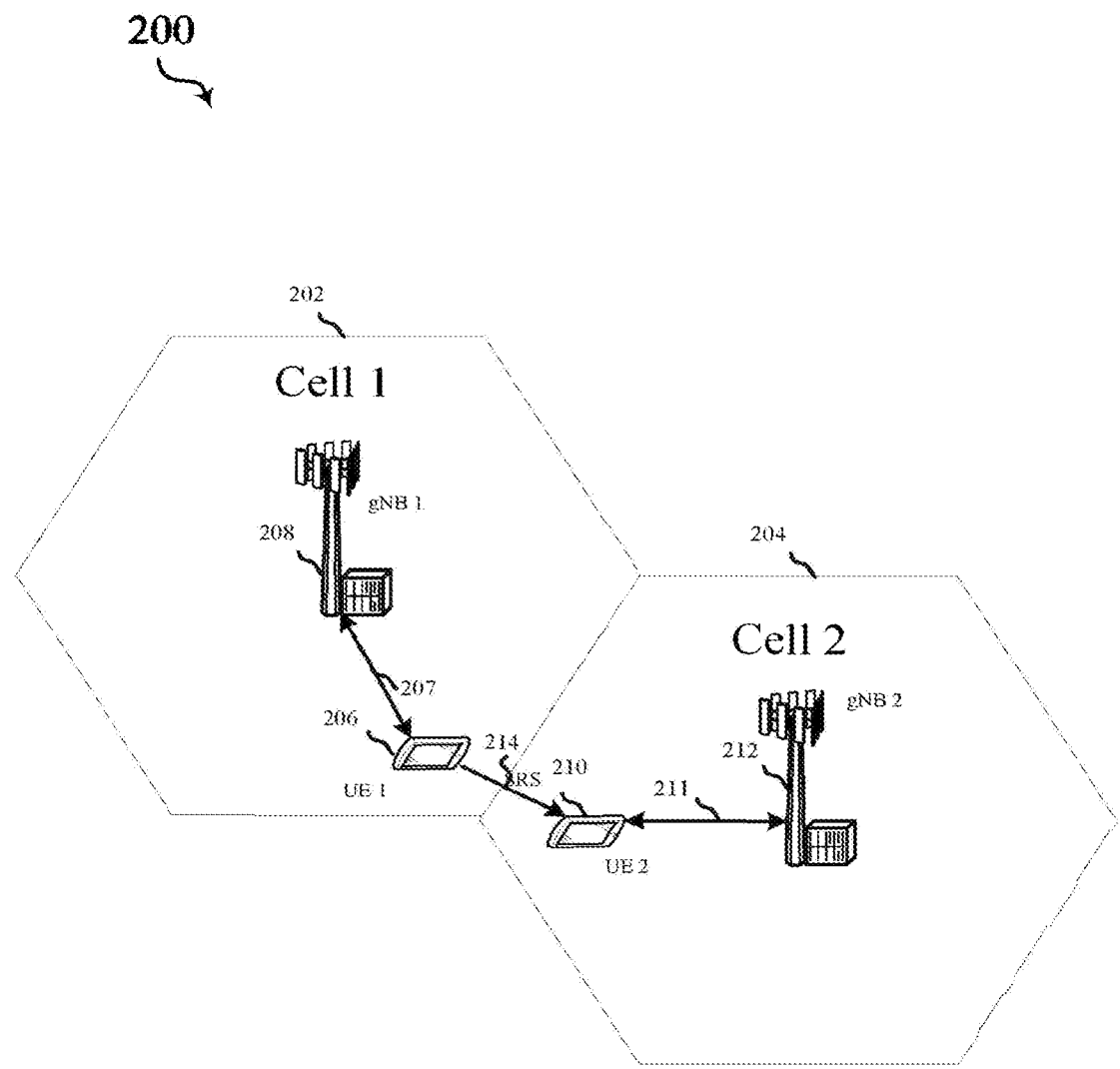
FIG. 2 illustrates an example of a second UE discovering a first UE in accordance with aspects of the present disclosure.

FIG. 2 illustrates an example of a second UE discovering a first UE 206 in accordance with aspects of the present disclosure. Shown in the illustration is a first cell 202 having a first UE 206 and a first gNB 208 in its coverage area. The first UE 206 and the first gNB 208 are in communication through a first link 207. Also shown in the illustration is a second cell 204 having a second UE 210 and a second gNB 208 in its coverage area. The second UE 210 is in communication with the second gNB 212 through a second link 211.

The first UE 206 in communication with the first gNB 208 through first link 207 may occasionally transmit an SRS 214. The SRS 214 may be transmitted by the UE 206 to enable the first gNB 208 to estimate uplink channel quality, or may be used for uplink timing estimation for example. The SRS may also be used by the second UE 210 for discovery purposes. The second UE 210 may receive the SRS 214 from a neighboring UE allowing the second UE 210 to discover other UEs transmitting SRS like the first UE 206. The SRS may also include a UE ID associated with the first UE 206 allowing the second UE 210 to positively identify the first UE 206. The second UE 210 may evaluate the signal strength and/or quality of the received SRS to determine if a direct link may be established between the first UE 206 and the second UE 210. If the received SRS 214 signal strength and/or quality is strong, then a direct link between the first UE 206 and second UE 210 may be a good option.

Figure 3:
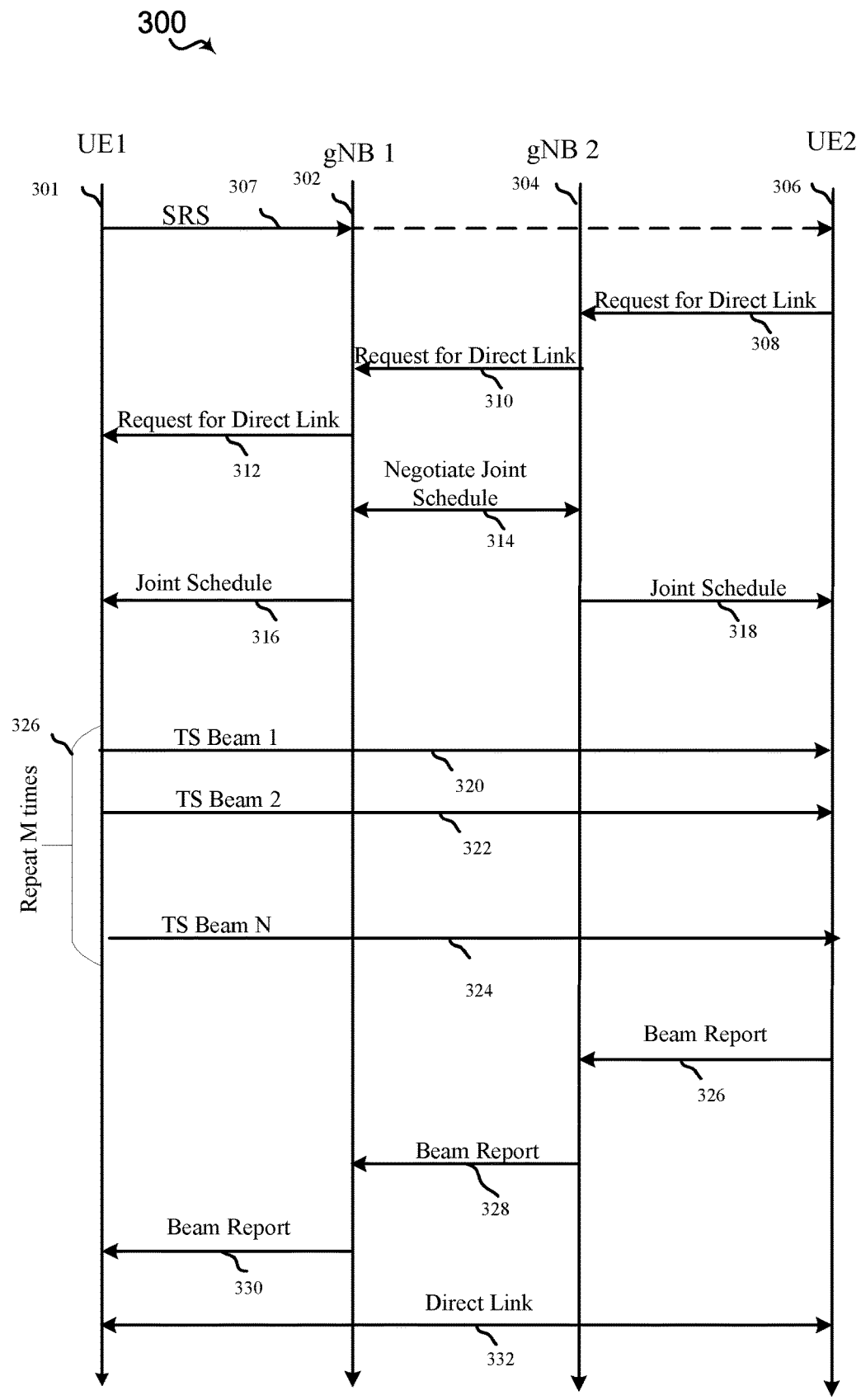
FIG. 3 illustrates an example of a direct link timeline in accordance with aspects of the present disclosure.

FIG. 3 illustrates an example of a direct link timeline 300 in accordance with aspects of the present disclosure. The UEs shown in the diagram may be the same UEs as shown in FIG. 1 and FIG. 2. Shown in the FIG. 3 is a timeline for a first UE 301, a first gNB 302, a second gNB 304 and a second UE 306.

During operation, the first UE 301 may send an SRS 307 to the first gNB 302. The second UE 306 may receive the SRS 307 and determine that the received SRS has a signal strength and/or quality that would make the second UE 306 a good candidate for establishing a direct UE to UE link. The second UE 306 may also determine the ID of the first UE 301 from the SRS and send a request for a direct link 308 to the second gNB 304. The second gNB 304 may be the serving gNB for second UE 306. The second gNB 306 may then in turn forward the request for a direct link 310 the first gNB 302. The first gNB 302 may be the serving gNB for the first UE 301. The gNB 302 may in turn forward the request for a direct link 312 to the first UE 301.

To facilitate a beam search procedure, the first gNB 302 and the second gNB 304 may negotiate a joint schedule 314 for performing a beam search. The first gNB 302 may send the joint schedule 316 to the first UE 301. Similarly, the second gNB 304 may send the joint schedule 318 to the second UE 306. The joint schedule may be used to determine how and when a direct link beam search procedure between the first UE 301 and the second UE 306 will be performed. The joint schedule may also call for the use of SRS resources during the direct link beam search.

Those skilled in the art will recognize there are many protocols for executing a beam search. In one exemplary aspect the first UE 301 may transmit in a first Transmit Search (TS) beam 320 in a first beam direction. Then the first UE 301 may transmit in a second TS beam 322 in a second beam direction. The first UE 301 may continue transmitting in different search beams in different directions until an Nth transmission in TS beam N 324 is sent. During this procedure the second UE 306 may try to receive the transmissions on a first receive beam in a first direction. Then, the first UE can retransmit the N TS beam 324 a second time while the second UE 306 attempts to receive the transmit beams on a second receive beam. This transmit sequence can be repeated M times 326 allowing the second UE 306 to attempt to receive the N transmissions on all M receive beams.

During the beam search the second UE 306 may prepare a beam search report. The beam search report may contain beam pair IDs, Reference Signal Receive Power (RSRP), Signal to Interference Noise Ratio (SINR), the Signal to Noise Ratio (SNR), Interference Measurement Resource (IMR) or other indicia of the radio link quality. The second UE 306 may then send the beam report 326 to the second gNB 304. The second gNB 304 may in turn send the beam report 328 to the first gNB 302. The first gNB 302 may in turn send the beam report 330 to the first UE 301. The first UE 301 and the second UE 306 may then establish a direct link 332. In various aspects, the beam pairs for the direct link may be chosen by the first UE 301, the second UE 306, the first gNB 302 or the second gNB 306.

Figure 4:
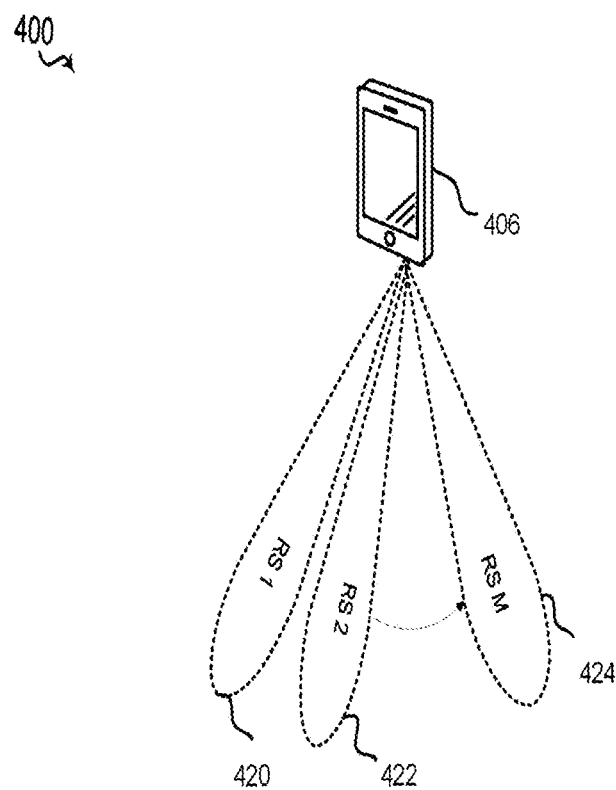
FIG. 4 illustrates an example of beam search in accordance with aspects of the present disclosure.
Figure 4:
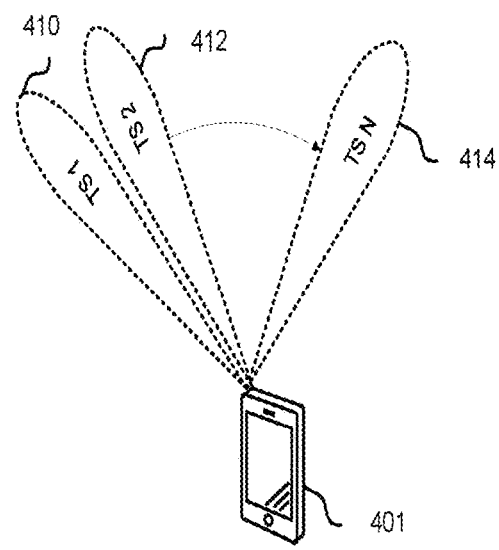

FIG. 4 illustrates an example of beam search 400 in accordance with aspects of the present disclosure. The beam search may be executed by the UEs shown in FIGS. 1-3 for example. Shown in FIG. 4 are a first UE 401 and second UE 406 executing an exemplary beam search procedure. The first UE 401 may transmit in a first Transmit Search (TS 1) beam 410 in a first direction while the second UE 406 receives on a first Receive Search (RS 1) beam 420. The first UE 401 may then transmit on TS 2 beam 412 in a second direction while the second UE 406 continues to receive on RS 1 beam 420. The first UE 401 may sweep through all N TS beams until UE 401 transmits on TS N beam 414 while the second UE continues to receive on RS 1 beam 420.

The first UE 401 may repeat the N TS beam transmit sweep again with the second UE attempting to receive on RS 2 beam 422. The first UE 401 may repeat the transmit sweep M times with the second UE 406 attempting to receive on each RS beam until the final sweep when the second UE receives on the RS M beam M 424.

Figure 5:
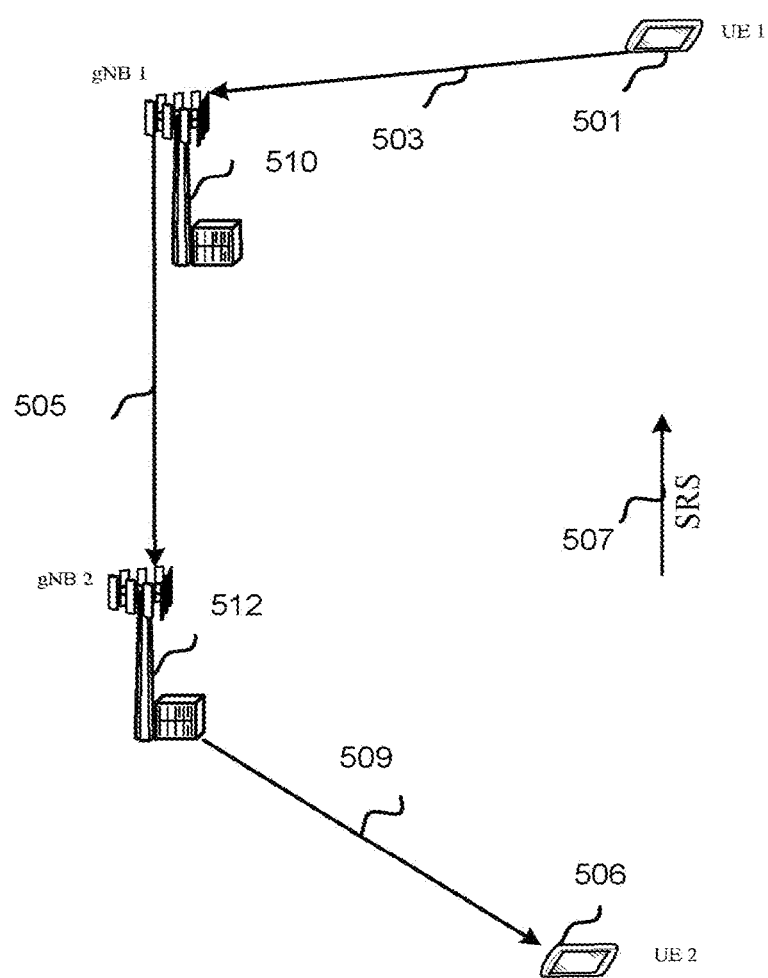
FIG. 5 illustrates an example of a direct link request in accordance with aspects of the present disclosure.

FIG. 5 illustrates an example of a direct link request 500 in accordance with aspects of the present disclosure. The base stations (gNBs) and UEs shown in FIG. 5 may be the base stations shown in FIGS. 1-4. Shown in FIG. 5 are a first UE 501 and a second UE 506. The first UE 506 is being served by a first gNB 510. The second UE 501 is being served by a second gNB 512. The second UE 506 may transmit an SRS 507 and the first UE 501 may receive the SRS 507. The first UE 501 may determine that the SRS 507 is a strong signal and determine that the second UE 506 is a good candidate for a direct link. The first UE 501 may then transmit a direct link request 503 to the first gNB 510. The first gNB 510 may forward the direct link request 505 to the second gNB 512. The second gNB 512 may in turn forward the direct link request 509 to the first UE 506.

Figure 6:
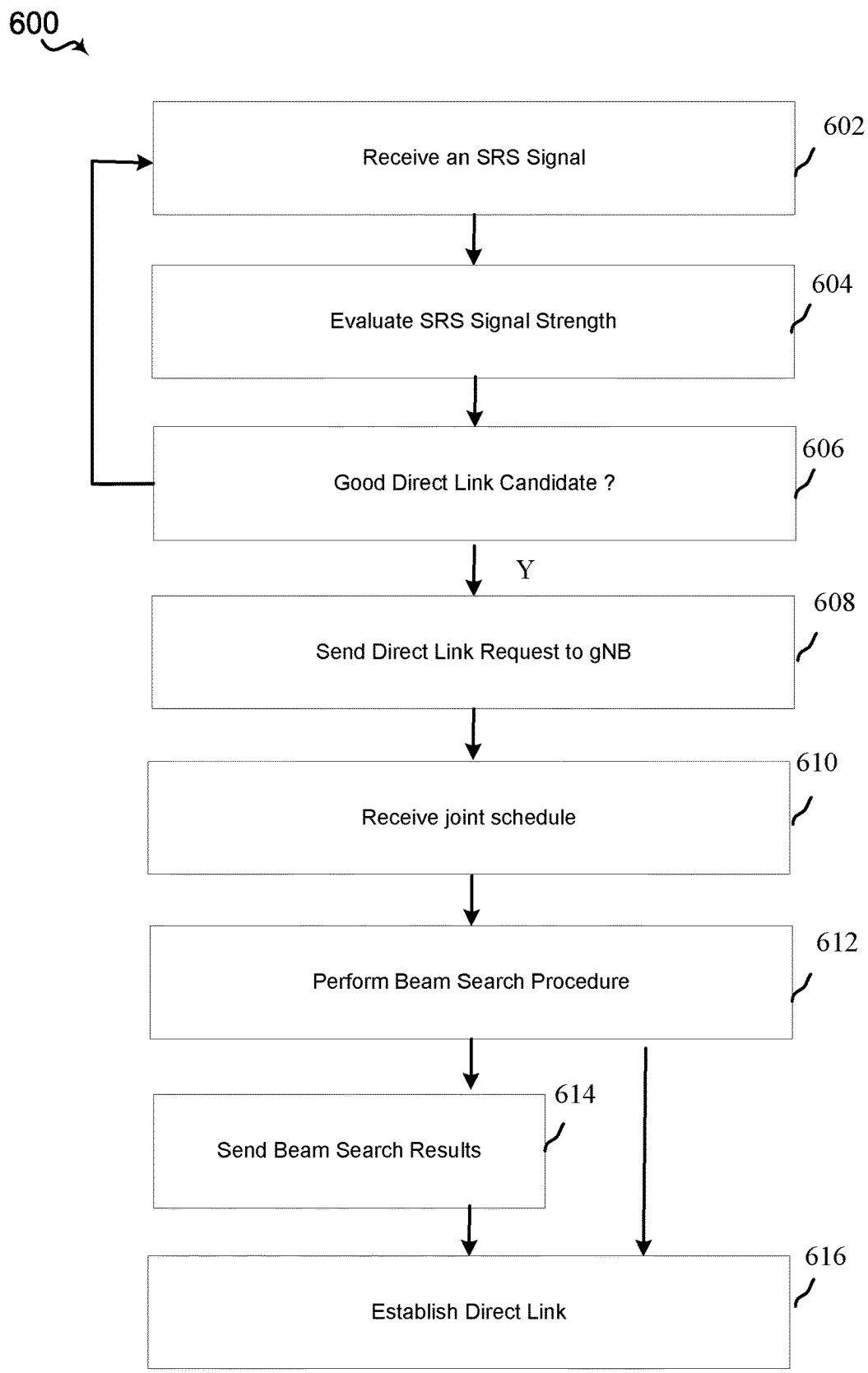
FIG. 6 illustrates an example of a flow diagram for a first UE in accordance with aspects of the present disclosure.

FIG. 6 illustrates an example of a flow diagram for a first UE 600 in accordance with aspects of the present disclosure. The first UE executing the flow may be one of the UEs shown in FIG. 1-5 for example. The first UE executing the flow may receive an SRS 602. The first UE may evaluate the received signal strength 604 and/or quality (e.g. RSRP, SINR, SNR IMR etc.) of the SRS. A strong SRS may be a good indicator that a second UE transmitting the SRS is a good direct link candidate 606. The SRS may contain an ID allowing the first UE to positively identify the second UE. If the second UE is good direct link candidate, the first UE may send a direct link request to the gNB 608 serving the first UE. The gNB may then forward the direct link request to a gNB serving the second UE. If it is determined that a link may be established the gNBs may negotiate a joint schedule for a beam search.

The first UE may then receive the joint schedule 610 from its serving gNB. The joint schedule may specify resources for performing a beam search. The joint schedule in some aspects, will assign SRS resources for the beam search. The joint schedule may also include transmitter and receiver assignments for performing the beam search. If the first UE is a receiver during the beam search it may send beam search results 614 to its serving gNB. The serving gNB may determine transmitter and receiver beam pairs for a direct link or receive information about beam pairs from the other gNB. The serving gNB may then communicate the beam pair information allowing the first UE to establish a direct link 616 with the second UE.

Figure 7:
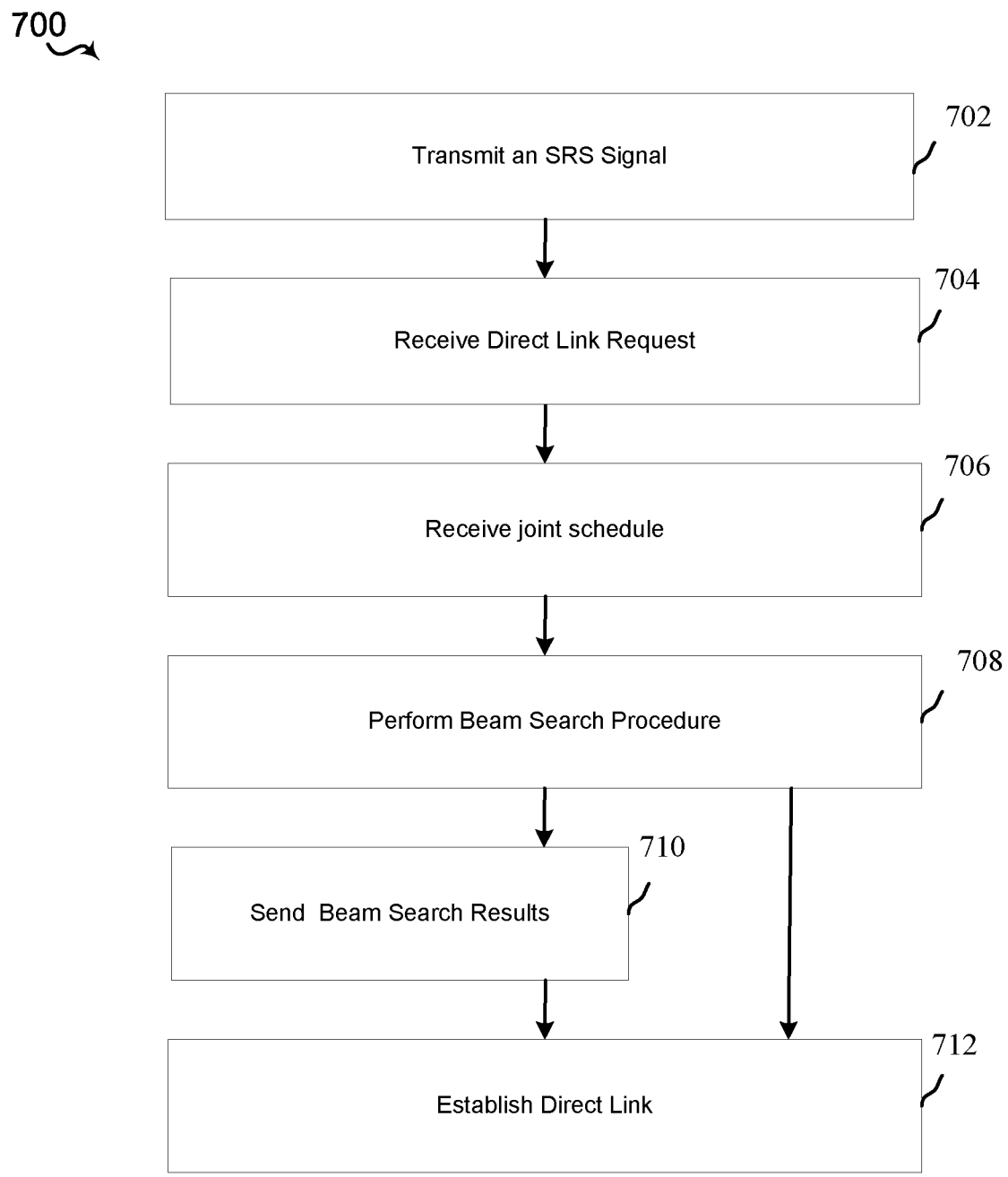
FIG. 7 illustrates an example of a flow diagram for a second UE in accordance with aspects of the present disclosure.

FIG. 7 illustrates an example of a flow diagram for a second UE 700 in accordance with aspects of the present disclosure. The second UE executing the flow may be one of the UEs shown in FIG. 1-5 for example. The second UE may transmit an SRS 702. The SRS may include the second UEs ID. The SRS signal may be received by a first UE located near the second UE. The first UE may send a direct link request to its serving gNB, that may forward the direct link request to the second UEs serving gNB, that may in turn forward it to the second UE, allowing the second UE to receive the direct link request 704. The second UE may also receive a joint schedule 706 from its serving base station allowing the second UE to perform a beam search procedure 708 with the first UE. The joint schedule in some aspects, will assign SRS resources for the beam search. The joint schedule may also include transmitter and receiver assignments for performing the beam search.

The second UE may perform the beam search procedure 708 according to the joint schedule. If the second UE is a receiver during the beam search it may send beam search results 710 to its serving gNB. The serving gNB may determine transmitter and receiver beam pairs for a direct link or receive information about beam pairs from the other gNB. The serving gNB may then communicate the beam pair information allowing the second UE to establish a direct link 712 with the first UE.

Figure 8:
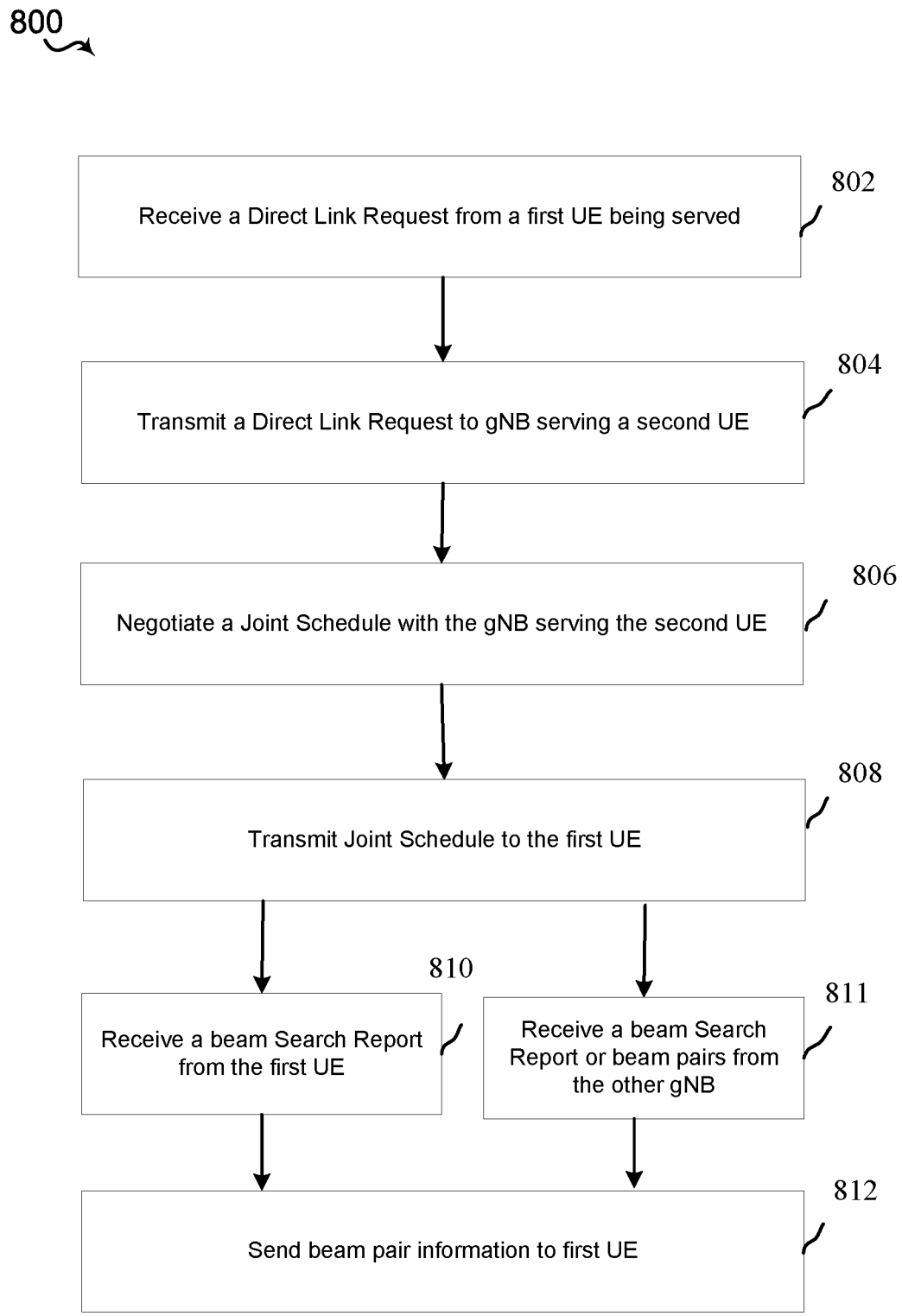
FIG. 8 illustrates an example of a flow diagram for a first gNB in accordance with aspects of the present disclosure.

FIG. 8 illustrates an example of a flow diagram for a first gNB 800 in accordance with aspects of the present disclosure. The first gNB executing the flow may be one of the base stations shown in FIG. 1-5 for example. The first gNB may receive a direct link request from a first UE being served 802. The first gNB may transmit a direct link request to the gNB serving the second UE 804. The first gNB may negotiate a joint schedule with the gNB serving the second UE 806. The joint schedule in some aspects, will assign SRS resources for the beam search. The joint schedule may also include transmitter and receiver assignments for performing the beam search.

The first gNB may then transmit the joint schedule to the first UE 808. Using the joint schedule, the first UE may perform a beam search. If the first UE is the receiver during the beam search the first UE will transmit a beam search report allowing the first base station to receive a beam search report from the first UE 810. If the first UE is the transmitter the first base station may receive a beam search report or beam pair information from the other gNB 811. The first gNB may then send beam pair information 812 to the first UE allowing the first UE to establish a direct link with the second UE.

Figure 9:
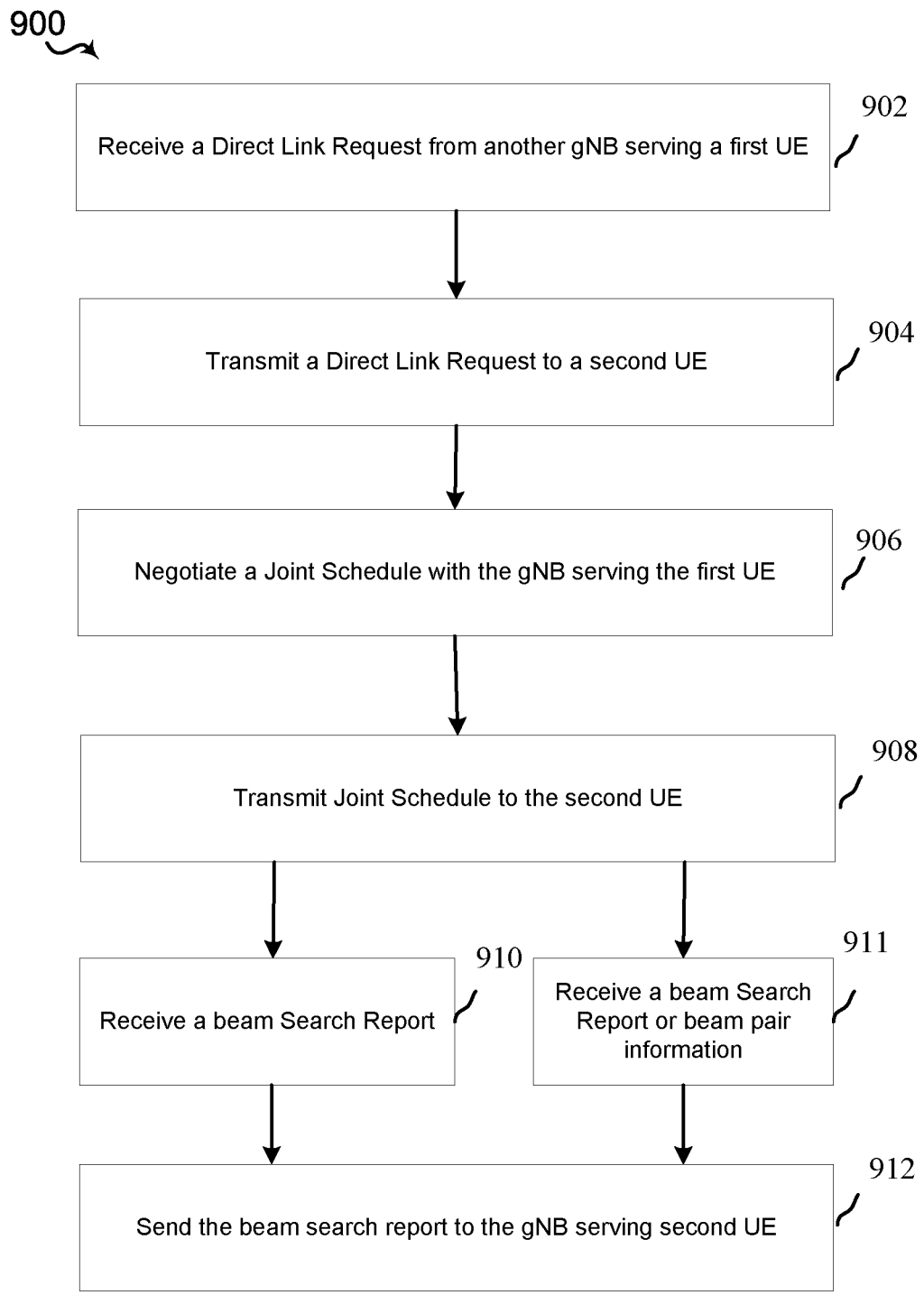
FIG. 9 illustrates an example of a flow diagram for a second gNB in accordance with aspects of the present disclosure.

FIG. 9 illustrates an example of a flow diagram for a second gNB 900 in accordance with aspects of the present disclosure. The second gNB may receive a direct link request from another gNB serving a first UE 902. The first gNB may transmit a direct link request to the second UE 904. The second gNB may negotiate a joint schedule with the gNB serving the first UE 906. The joint schedule in some aspects, will assign SRS resources for the beam search. The joint schedule may also include transmitter and receiver assignments for performing the beam search.

The second gNB may then transmit the joint schedule to the second UE 908. Using the joint schedule, the second UE may perform a beam search. If the second UE is the receiver during the beam search the second UE will transmit a beam search report allowing the second base station to receive a beam search report 810 from the second UE. If the second UE is the transmitter the first base station may receive a beam search report or beam pair information 911 from the other gNB. The second gNB may then send beam pair information 912 to the second UE allowing the second UE to establish a direct link with the first UE.

Figure 10:
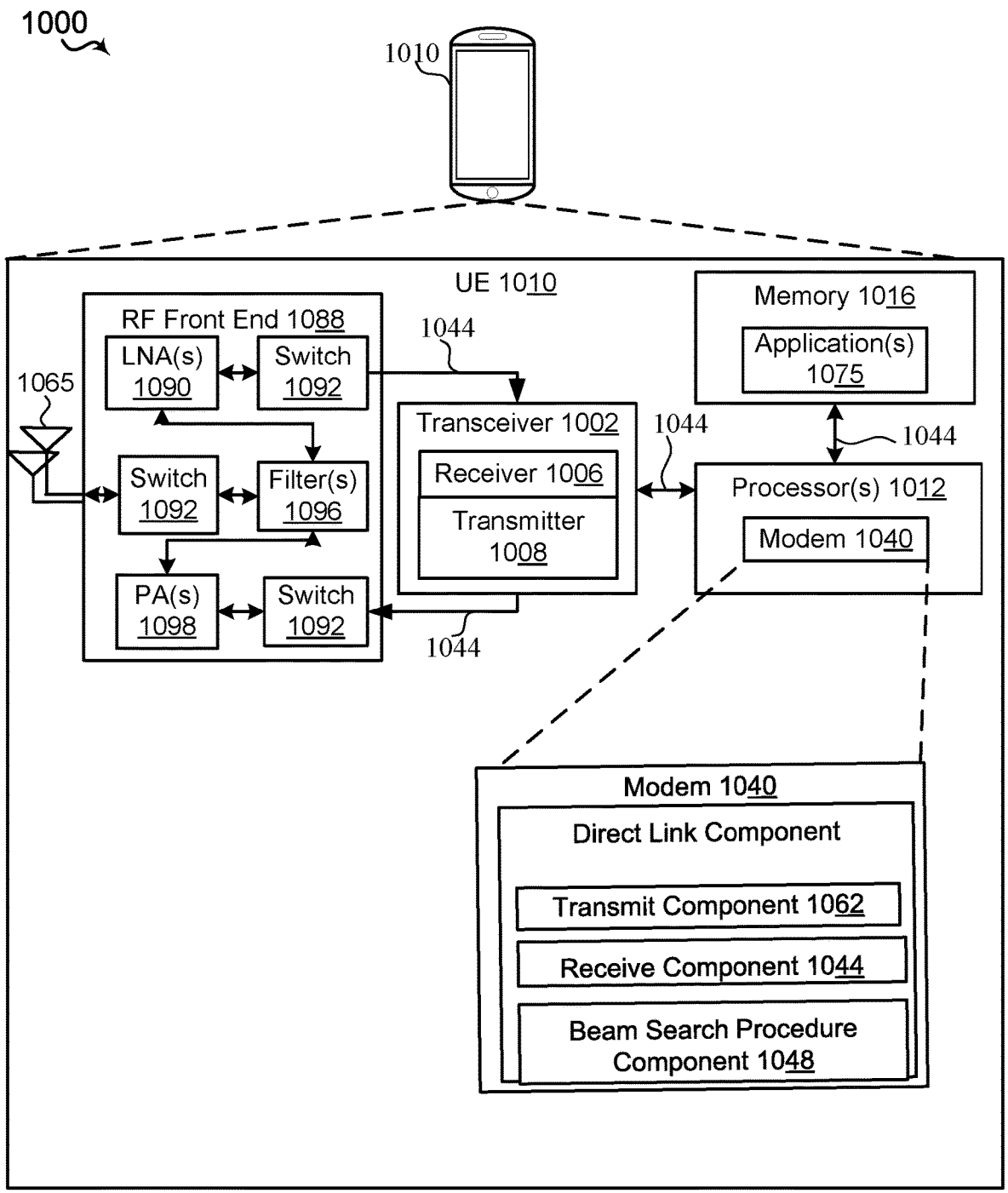
FIG. 10 illustrates an example of a UE in accordance with aspects of the present disclosure.

Referring to FIG. 10, in accordance with various aspects of the present disclosure an example of an implementation of UE 1010 is shown 1000. UE 1010 may be one of the UEs 110 depicted in FIG. 1-5 for example. UE 1010 may also be one of the UEs shown in FIG. 3 and may be functional to carry out the flows shown in FIGS. 7 and 8. It may include a variety of components, some of which have already been described above, but including components such as one or more processors 1012 and memory 1016 and transceiver 1002 in communication via one or more buses 1044, which may operate in conjunction with modem 1040 and the direct link component to enable one or more of the functions described herein related to discovering another UE via an SRS or sending an SRS allowing other UEs to discover it. In other aspects some of the functions of modem 1040 may be performed by other processors 1012. The transmit component 1044 and receive component 1062 may be used to perform beam searches including beam searches that use SRS resources. Further, the one or more processors 1012, modem 1040, memory 1016, transceiver 1002, RF front end 1088 and one or more antennas 1065, may be configured to support voice and/or data calls (simultaneously or non-simultaneously) in one or more radio access technologies as well as radar.

In an aspect, the one or more processors 1012 can include a modem 1040 that uses one or more modem processors. The various functions related to the direct link component may be included in modem 1040 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1040 associated with modem 1040 may performed by transceiver 1002.

Also, memory 1016 may be configured to store data used herein and/or local versions of applications 1075 or the direct link component and/or one or more of its subcomponents being executed by at least one processor 1012. Memory 1016 can include any type of computer-readable medium usable by a computer or at least one processor 1012, such as random-access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining radar component and/or one or more of its subcomponents, and/or data associated therewith, when UE 1010 is operating at least one processor 1012.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station. Additionally, receiver 1006 may process such received signals, including SRS, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 1010 may include RF front end 1088, which may operate in communication with one or more antennas 1065 and transceiver 1002 for receiving and transmitting radio transmissions, for example, wireless communications transmitted by at least one base station or wireless transmissions transmitted by UE. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 892 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that UE can communicate with, for example, one or more base stations or one or more cells associated with one or more base stations. In an aspect, for example, modem 1040 can configure transceiver 1002 to operate at a specified frequency and power level based on the UE configuration of the and the communication protocol used by modem 1040.

In an aspect, modem 1040 can be a multiband-multimode modem, which can process digital data and communicate with transceiver 1002 such that the digital data is sent and received using transceiver 1002. In an aspect, modem 1040 can be multiband and be configured to support multiple frequency bands for a specific communications protocol. In an aspect, modem 1040 can be multimode and be configured to support multiple operating networks and communications protocols. In an aspect, modem 1040 can control one or more components of UE (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with as provided by the network during cell selection and/or cell reselection.

Figure 11:
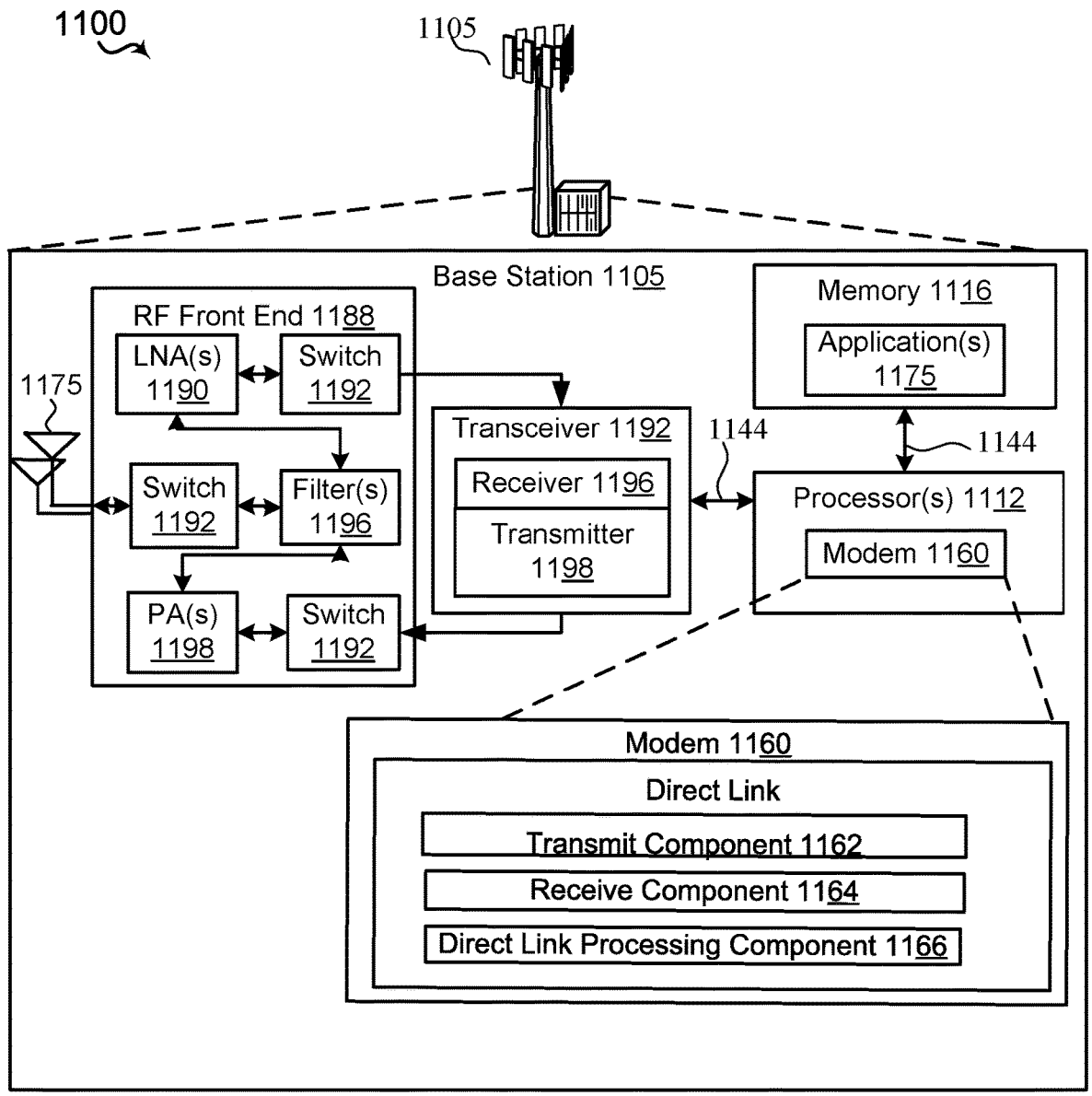
FIG. 11 illustrates an example of a gNB in accordance with aspects of the present disclosure.

Referring to FIG. 11, in accordance with various aspects of the present disclosure an example of an implementation of base station, such as one of the base stations (gNBs) shown in FIGS. 1-3 and 5 that may include a variety of components, some of which have already been described above, but including components such as one or more processors 1112 and memory 1116 and transceiver 1102 in communication via one or more buses 1144, which may operate in conjunction with modem 1160 and direct link component o enable one or more of the functions described herein related to establishing a direct UE to EE link via an SRS discovery process. The base station shown in FIG. 11 may be also configured to execute the flows in FIGS. 9-10.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of UE, as described above, but configured or otherwise programmed for base station operations as opposed to UE operations.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method of operating a first User Equipment (UE) associated with a first network node, comprising:
   receiving a Sounding Reference Signal (SRS) from a second UE associated with a second network node;
   measuring a signal quality of the SRS;
   determining whether the second UE is a candidate for a direct link based on the signal quality measurement;
   transmitting, to the first network node, a request for the second network node to establish a direct link between the first UE and the second UE; and
   receiving a joint schedule for a beam search procedure from the first network node, the joint schedule indicating SRS resources over which the beam search procedure is to be performed.

2. The method of claim 1 further comprising determining an ID of the second UE based on the received SRS.

3. The method of claim 2 further comprising performing the beam search procedure.

4. The method of claim 3 further comprising transmitting a beam search report to the first network node.

5. The method of claim 4 further comprising receiving information about a direct link beam pair for establishing a direct link between the first UE and the second UE.

6. A first User Equipment (UE) associated with a first network node, comprising:
   a receiver adapted to receive a Sounding Reference Signal (SRS) from a second UE associated with a second network node; and
   a processor adapted to:
      measure a signal quality of the SRS;
      determine whether the second UE is a candidate for a direct link based on the signal quality measurement;
      a transmitter adapted to transmit, to the first network node, a request for the second network node to establish a direct link between the first UE and the second UE; and
      receive a joint schedule for a beam search procedure from the first network node, the joint schedule indicating SRS resources over which the beam search procedure is to be performed.

7. The first UE of claim 6 wherein the processor is adapted to determine an ID of the second UE based on the received SRS.

8. The first UE of claim 7 wherein the processor is adapted to perform the beam search procedure.

9. The first UE of claim 8 wherein the transmitter is adapted to transmit a beam search report to the first network node.

10. The first UE of claim 9 wherein the receiver is adapted to receive information about a direct link beam pair for establishing a direct link between the first UE and the second UE.

11. A first User Equipment (UE) associated with a first network node, comprising:
   means for receiving a Sounding Reference Signal (SRS) from a second UE associated with a second network node;
   means for measuring a signal quality of the SRS;
   means for determining whether the second UE is a candidate for a direct link based on the signal quality measurement;
   means for transmitting, to the first network node, a request for the second network node to establish a direct link between the first UE and the second UE; and
   means for receiving a joint schedule for a beam search procedure from the first network node, the joint schedule indicating SRS resources over which the beam search procedure is to be performed.

12. The first UE of claim 11 further comprising means for determining an ID of the second UE based on the received SRS.

13. The first UE of claim 12 further comprising means for performing the beam search procedure.

14. The first UE of claim 13 further comprising means for transmitting a beam search report to the first network node.

15. The first UE of claim 14 further comprising means for receiving information about a direct link beam pair for establishing a direct link between the first UE and the second UE.

* * * * *